United States Patent
Nister et al.

(10) Patent No.: US 9,304,586 B2
(45) Date of Patent: *Apr. 5, 2016

(54) EYE-TYPING TERM RECOGNITION

(71) Applicant: Microsoft Technology Licensing, LLC, Redmond, WA (US)

(72) Inventors: David Nister, Bellevue, WA (US); Vaibhav Thukral, Kirkland, WA (US); Djordje Nijemcevic, Kragujevac (RS); Ruchi Bhargava, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/573,502

(22) Filed: Dec. 17, 2014

(65) Prior Publication Data

US 2015/0103000 A1 Apr. 16, 2015

Related U.S. Application Data

(63) Continuation of application No. 13/536,778, filed on Jun. 28, 2012, now Pat. No. 8,917,238.

(51) Int. Cl.
*G06F 3/01* (2006.01)
*G06F 3/023* (2006.01)

(52) U.S. Cl.
CPC .............. *G06F 3/013* (2013.01); *G06F 3/0233* (2013.01); *G06F 3/0236* (2013.01); *G06F 3/0237* (2013.01)

(58) Field of Classification Search
CPC ....................................................... G06F 3/013
See application file for complete search history.

(56) References Cited

U.S. PATENT DOCUMENTS

| 6,243,076 | B1 | 6/2001 | Hatfield |
| 6,282,553 | B1 | 8/2001 | Flickner et al. |
| 2012/0075168 | A1* | 3/2012 | Osterhout et al. ................. 345/8 |
| 2012/0105486 | A1* | 5/2012 | Lankford et al. .............. 345/661 |
| 2013/0050089 | A1* | 2/2013 | Neels et al. ................... 345/168 |

OTHER PUBLICATIONS

Majaranta, Päivi., "Text Entry by Eye Gaze", Retrieved at <<http://acta.uta.fi/pdf/978-951-44-7787-4.pdf>>, Aug. 1, 2009, pp. 175. Submitted in two parts.

Zhu, et al., "A Hybrid Fuzzy Approach for Human Eye Gaze Pattern Recognition", Retrieved at <<http://users.cecs.anu.edu.au/~aasthana/Papers/ICONIP08.pdf, 15th International Conference, ICONIP, Nov. 25-28, 2008, pp. 1-8.

(Continued)

*Primary Examiner* — Alexander Eisen
*Assistant Examiner* — Cory Almeida
(74) *Attorney, Agent, or Firm* — Dan Choi; Judy Yee; Micky Minhas

(57) ABSTRACT

Various embodiments related to entering text into a computing device via eye-typing are disclosed. For example, one embodiment provides a method that includes receiving a data set including a plurality of gaze samples, each gaze sample including a gaze location and a corresponding point in time. The method further comprises processing the plurality of gaze samples to determine one or more likely terms represented by the data set.

19 Claims, 10 Drawing Sheets

(56) References Cited

OTHER PUBLICATIONS

Wobbrock, et al., "Not Typing but Writing: Eye-based Text Entry Using Letter-like Gestures", Retrieved at <<http://www.tobii.com/Global/Analysis/Marketing/Research%20Paper/Eye%20control/Eye-based%20Text%20Entry%20Using%20Letter-like%20Gestures.pdf>>, The 3rd Conference on Communication by Gaze Interaction COGAIN, Sep. 2007, 2 Pages.

Frey, et al., "Eye-gaze word processing", Retrieved at <<http://ieeexplore.ieee.org/stamp/stamp.jsp?tp=&arnumber=105094>>, IEEE Transactions on Systems, Man and Cybernetics, vol. 20, No. 4, Jul./Aug. 1990, pp. 944-950.

Majaranta, et al., "Effects of feedback and dwell time on eye typing speed and accuracy", Retrieved at <<http://citeseerx.ist.psu.edu/viewdoc/download?doi=10.1.1.181.144&rep=rep1&type=pdf>>, Jul. 13, 2006, pp. 199-208.

Ward, et al., "Fast Hands-free Writing by Gaze Direction", Retrieved at <<http://arxiv.org/pdf/cs/0204030v4.pdf>>, Aug. 22, 2002, pp. 1-3.

\* cited by examiner

EYE-TYPING TERM RECOGNITION

CROSS REFERENCE TO RELATED APPLICATIONS

This application is a continuation of U.S. patent application Ser. No. 13/536,778, filed on Jun. 28, 2012, and titled "EYE-TYPING TERM RECOGNITION" the entire disclosure of which is hereby incorporated herein by reference.

BACKGROUND

To interact with a computer application or search the Internet, users may type in terms using a physical keyboard or on-screen keyboard. This may not be possible if a physical or on-screen keyboard is not available, or if the keyboard is inside a virtual display that cannot be touched physically. Additionally, physical or on-screen keyboards may pose difficulties for users that cannot type because of a medical condition.

SUMMARY

Various embodiments related to entering text into a computing device via eye-typing are disclosed. For example, one embodiment provides a method comprising receiving a data set comprising a plurality of gaze samples, each gaze sample comprising a gaze location and a corresponding point in time. The method further comprises processing the plurality of gaze samples to determine one or more likely terms represented by the data set.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Standard eye-typing techniques involve a user fixating his or her gaze on each key for a relatively long period of time as the eye-typing system processes the user's gaze and determines an intended letter on a key-by-key basis. This may result in an unsatisfactorily long process, and/or may result in user fatigue. Thus, the disclosed embodiments are directed to eye typing via movements that may be more natural to perform. For example, as described in more detail below, by gathering a plurality of gaze samples taken from an initiation of eye-typing until an indication that the user has finished eye-typing, and then processing the plurality of gaze samples together, entire words may be processed at one time. This may allow the user to fixate on each key for a relatively short amount of time. Pattern recognition and/or fuzzy matching of keys may be utilized on the gaze samples to determine one or more likely words typed by the user.

Figure 1:
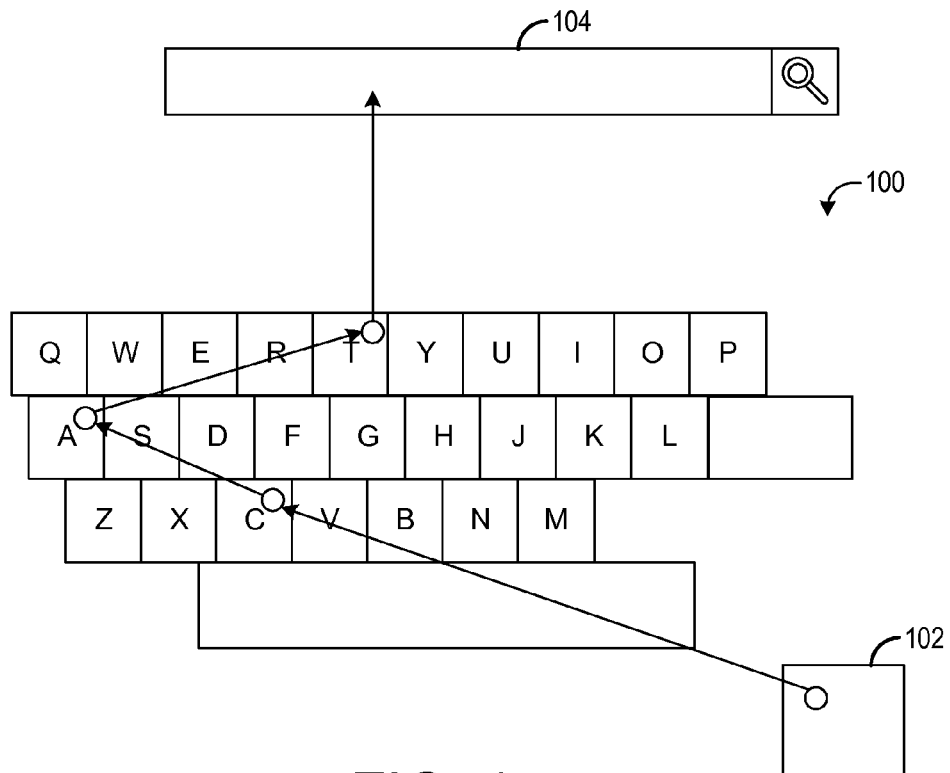
FIG. 1 schematically shows an example layout of user input keys for use in eye-typing according to an embodiment of the present disclosure, and also shows an eye scan path followed in an example eye typing session.

Turning to FIG. 1, an example embodiment of an on-screen keyboard 100 for use in eye-typing is shown. The on-screen keyboard 100 may be displayed on a suitable display device, including but not limited to a head-mounted see-through display device, a computing device, a mobile computing device, a television, etc. The on-screen keyboard 100 includes a plurality of keys, as shown herein including letters of the alphabet arranged in the standard QWERTY layout. However, any key layout is within the scope of this disclosure. In addition to the on-screen keyboard 100, one or more sensors may be present (not shown in FIG. 1) to facilitate eye-typing. The sensors may be located on the display device, located remotely from the display device, worn by a user, or a combination of the above. The sensors, which may include eye-tracking sensors, may collect information regarding the location of the user's gaze at each sample point. Additional information about the display device and sensors will be presented below with respect to FIGS. 10-12.

FIG. 1 illustrates an example eye-typing sequence as input by a user and tracked by one or more eye-tracking sensors. Once a user has initiated eye-typing, the user may quickly gaze over the on-screen keyboard 100, briefly focusing his or her gaze on desired keys. User eye fixations, which indicate user focus on a particular location, are depicted by the circles, with the temporal direction of the eye-typing input indicated by the arrows.

The user may gaze at a particular region of the keyboard 100, such as a trigger key 102, in order to initiate eye-typing. The user may then gaze at the keyboard 100, focusing his or her gaze on one or more desired keys. For example, as shown in FIG. 1, the user has gazed at the letters C, A, and T. The user may then indicate he or she has completed eye-typing by gazing at an input bar 104, located above the keyboard, or by any other suitable method. During the eye-typing, the eye-tracking sensors may collect a gaze location for each point in time. The resultant gaze samples may then be processed to determine one or more likely words the user intended to type.

Figure 2:
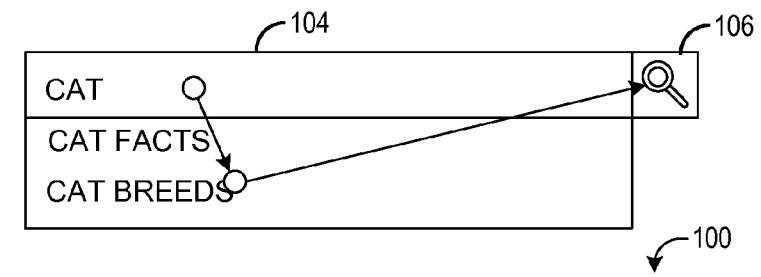
FIG. 2 shows a plurality of search terms returned in response to the eye-typing session of FIG. 1.
Figure 2:
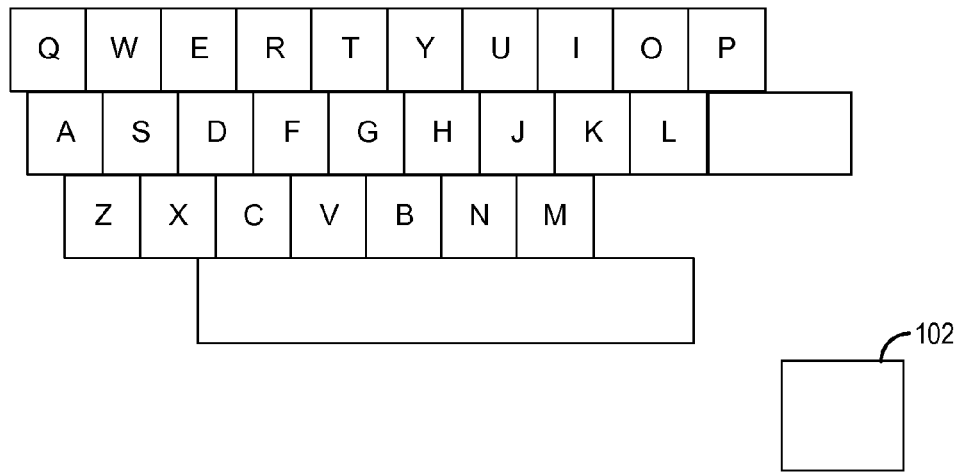

FIG. 2 shows an example search function provided by the eye-typing system of the present disclosure. Upon the processing of the gaze samples collected from the example eye-typing described above with respect to FIG. 1, it may be determined that the user typed the word "cat." As such, the word cat appears in the search input bar 104. Additionally, in some embodiments, an autosuggest function may be present, in which additional search terms related to the likely word may also be displayed. In the example of FIG. 2, the terms "cat facts" and "cat breeds" are displayed as related terms. The autosuggest function may display search terms present in recent searches and/or popular search terms.

The user may select one of the displayed search terms in a suitable manner. In one example, the user may select a displayed search term by gazing at the selected search term, and then gazing at a search key 106. For example, as shown, the user has gazed at the term "cat breeds" and then at the search key 106. As a result, a search for the term "cat breeds" will be performed. In another example, the user may "swipe" through the selected search term using his or her eyes, quickly gazing through the word in a right-to-left or left-to-right direction. In other embodiments, the user may issue a voice command indicating the selected term. Further, in some embodiments, the user may gaze at the selected search term, and need not gaze at the search key.

Figure 3:
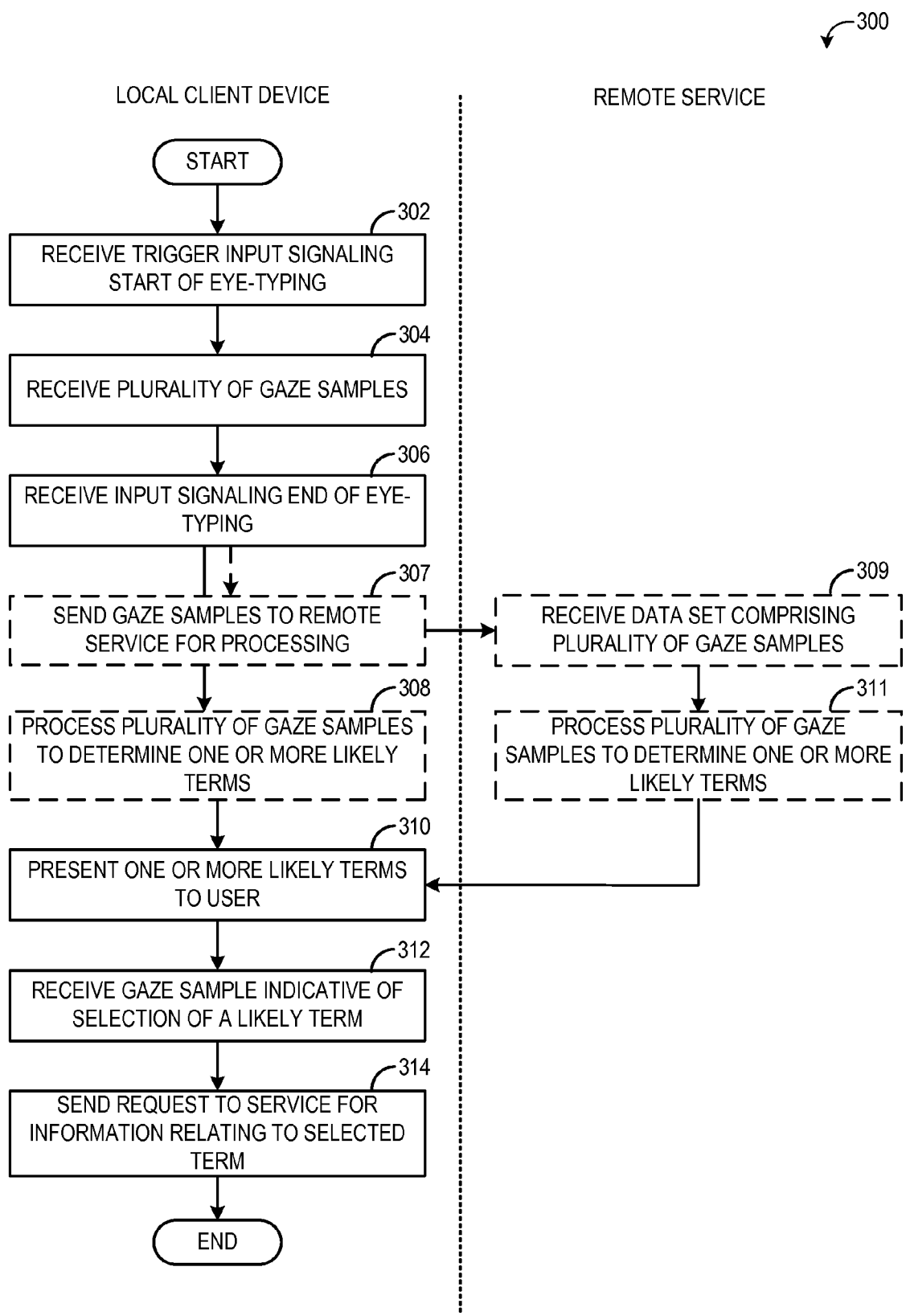
FIG. 3 is a flow chart illustrating a method for performing a search using eye-typing according to an embodiment of the present disclosure.

FIG. 3 is a flow chart illustrating an embodiment of a method 300 for eye-typing. Method 300 may be carried out by a local client device including a display configured to display an on-screen keyboard, by a computing device configured to communicate with a local client device including a display for displaying an on-screen keyboard, or in any other suitable manner. Method 300 illustrates that various processes may be performed on a local client device including a display (e.g., a head-mounted see-through display device or other display device) or other computing device, and/or on a remote service in communication with the display or other computing device.

Method 300 includes, at 302, receiving trigger input indicating initiation of eye-typing. As explained previously, to initiate eye-typing, the user may look at a trigger displayed on the display. For example, a specific trigger key may be present on the display, and if the user gazes at the trigger key for a threshold duration, then an indication is received that the user intends to begin eye-typing. In some embodiments, the trigger key may be a keyboard key that when gazed at, causes the keyboard to be displayed on the display. In this way, the keyboard may appear on the display when the trigger key is activated. In other embodiments, the keyboard may be displayed persistently, or upon the occurrence of any other suitable trigger, such as the user issuing a voice command.

At 304, a plurality of gaze samples is received. Each gaze sample may comprise a location of the user's gaze, for example in x, y coordinates, and in some embodiments may include a time stamp indicating a point in time from the initiation of eye-typing until the gaze sample was collected. In other embodiments, the plurality of gaze samples may comprise a list ordered according to an order in which the eye samples were received, and may omit time stamp information.

Each gaze sample may be received from observation information collected from one or more sensors. For example, one or more eye-tracking image sensors, motion sensors, and/or any other suitable sensors may collect information that can be utilized to determine a gaze location of the user. The gaze samples may be collected at regular time intervals, for example once each millisecond, once each 10 milliseconds, or at any other suitable frequency.

At 306, an input signaling the end of the eye typing session is received, wherein the term "eye typing session" represents eye typing that occurs between the input signaling the start of eye typing at 302 and the input signaling the end of eye typing at 304. For example, the user may gaze at an input bar, or at a specific key on the keyboard, after typing the intended term or terms. Other inputs may also signal an end to eye-typing, such as the user issuing a voice command, a gesture command, and/or any other suitable command.

After the eye-typing is complete and all gaze samples have been received, the gaze samples may be processed to determine one or more likely terms the user intended to type. This processing may be done locally on the local client device, or by the remote service. Thus, method 300 optionally includes, at 307, sending the plurality of gaze samples to a remote service via a network or other form of inter-process communication. Method 300 may include, at 309, receiving a data set comprising the plurality of gaze samples at the remote service, and at 311, processing to determine one or more likely terms. The remote service may then send via the network the one or more likely terms to the local client device at 310, which will be described below.

In other embodiments, such processing may be performed in part or fully by the local client device. In such embodiments, method 300 includes, at 308, processing the plurality of gaze samples to determine one or more likely terms. The processing of the gaze samples, whether performed by the local client device or by a remote service, may include pattern recognition, fuzzy matching, or other techniques that assign a likelihood score to each term in a term database (e.g., a dictionary), with the top-scoring term or term being returned as the one or more likely terms. Additional information regarding the processing of the gaze samples will be provided below with respect to FIGS. 4-9.

At 310, the one or more likely terms are presented to the user. Presenting the one or more likely terms may include sending to the one or more likely terms to the display in order to display the terms to the user. For example, as explained above with respect to FIG. 2, the terms may be displayed in a search box, if a search function is being performed, or the terms may be displayed in a word processing document or email. The terms may be displayed in any suitable location on the display. Further, in some embodiments, the terms may be presented to the user in a form other than via the display, such as played back to the user in audio form.

At 312, method 300 includes receiving a gaze sample indicative of a selection of one of the one or more likely terms. In response to the one or more likely terms being displayed to the user, he or she may select one of the terms as an intended term by gazing at the term for a threshold amount of time, by gazing at the term and then gazing at a search or select key on the keyboard, or in any other suitable manner. The intended, selected term may then be entered into a search function. Thus, at 314, a request is sent to a remote service (either the same remote service performing path 303 or a different remote service) for information relating to the selected term. It will be understood that the selected term or terms may be used for any other suitable end use than a search request, including but not limited to as content in messages, documents, etc., control commands for a user interface, etc.

Figure 4:
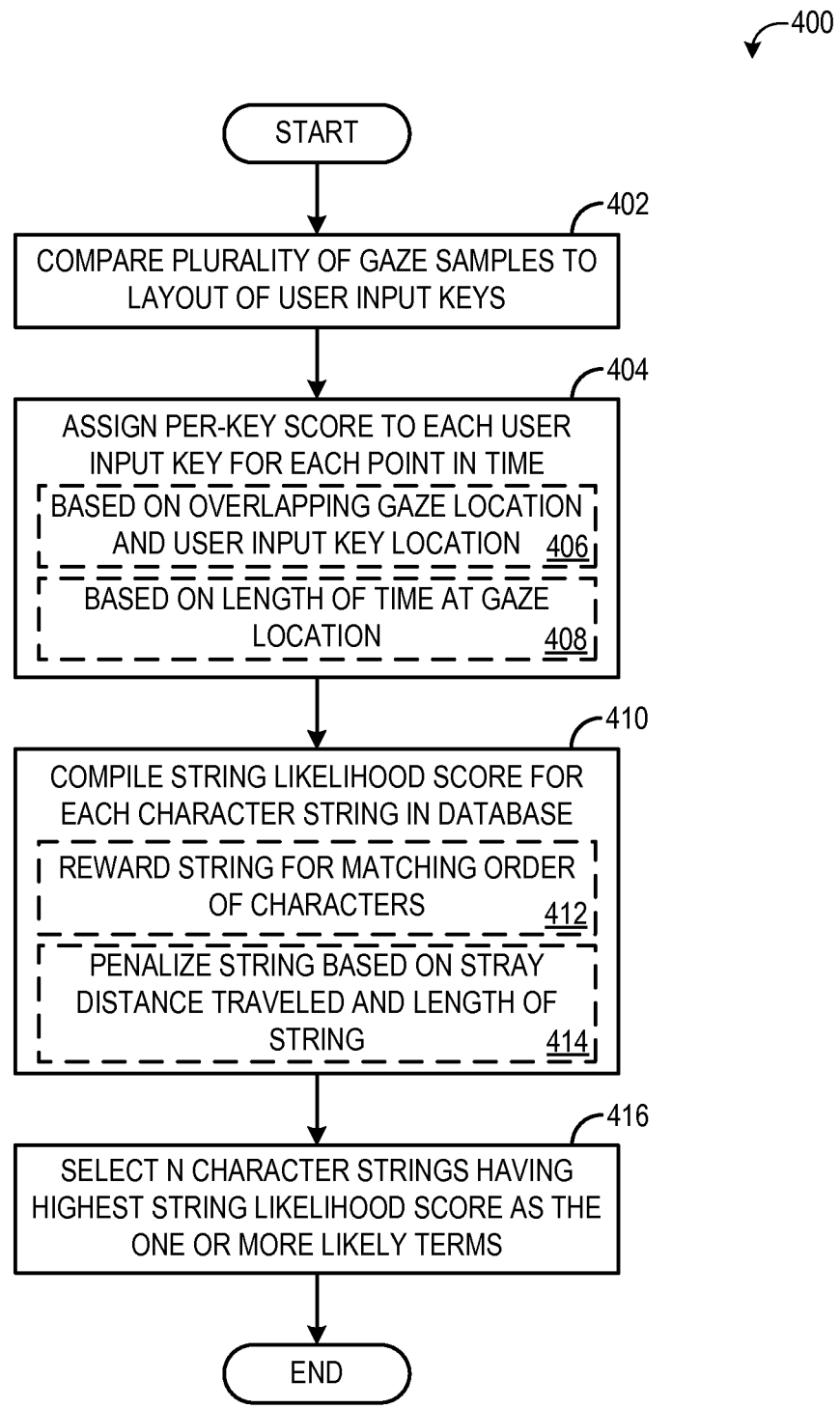
FIG. 4 is a flow chart illustrating an embodiment of a method for processing a plurality of gaze samples.

Turning to FIG. 4, an embodiment of a method 400 for processing a plurality of gaze samples is depicted. Method 400 may be carried out by a computing device that has received a plurality of gaze samples collected during an instance of eye-typing, and may be performed as part of method 300 described above. At 402, method 400 includes comparing the plurality of gaze samples to a layout of user input keys, for example an on-screen keyboard. As explained previously, the gaze samples are a series of gaze coordinates periodically sampled in time that may be used to correlate gaze location to a particular user input key.

At 404, a per-key score is assigned to each user input key for each point in time. For each gaze sample in time, a score is computed for each key on the keyboard. For a given key and a given point in time, the score represents the probability that the user's gaze was intentionally directed at the key at that point in time. The per-key scores may be based on factors such as overlapping gaze and user input key location at 406. Therefore, the larger the distance between the gaze location and a particular key, the lower the score for that key. The score may alternatively or additionally depend on other factors, including the length of time spent gazing at each key at 408, gaze speed at the given moment, and/or any other suitable factor.

Figure 5:
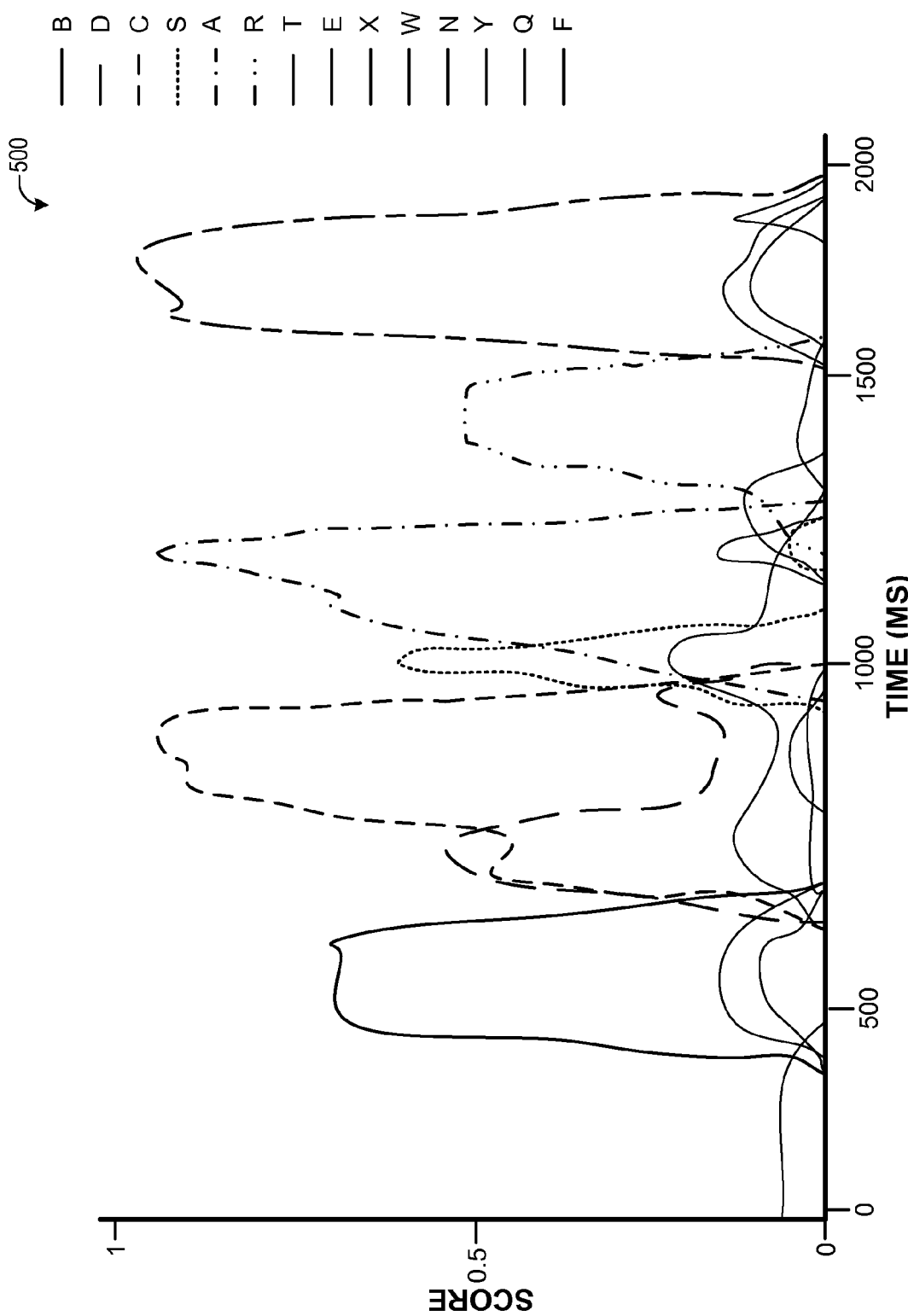
FIG. 5 is a diagram illustrating example per-key scores for a plurality of gaze samples according to an embodiment of the present disclosure.

FIG. 5 is a graph illustrating a possible per-key score plot 500 in time for the example eye-typing input from FIG. 1. Time is illustrated in milliseconds on the x-axis, and the per-key score (which may be normalized to the [0.1] range) is on the y-axis. Scores for a subset of the user input keys, rather than the entirety of the keys, are illustrated for clarity.

From FIG. 1 it appears that the first key that was gazed at by the user was the C key, however, the user may have gazed at nearby keys, such as B or V, before focusing his or her gaze on the C key. Therefore, the B key (marked by a solid line FIG. 5) is the first key in time having a significant score. Additional keys having a significant score include D, C, S, A, R, and T. Other keys further away from the keys which were gazed at, including E, X, W, etc. are assigned less significant scores. These per-key scores may then be used to determine one or more likely terms, as will be explained below.

Returning to FIG. 4, at 410 method 400 includes compiling a string likelihood score for each character string in a character string database. The string likelihood score for a particular character string in the database reflects the probability that the pattern created by the eye-typing matches a pattern that would be created for the particular string. The character string database may be any suitable database of character strings, such as a dictionary of words, database of Internet search terms, etc.

Calculating this probability may include rewarding character strings from the database that include characters that match the order in which the characters (e.g., input keys) were gazed at during the collection of the gaze samples, as indicated at 412. In some embodiments, determining if the characters in the character string match the order in which the characters were gazed may be computed using dynamic programming. For example, in one example, for all suffixes of the character string ($S_1, S_2, \ldots, S_n$, where n is the term's length), a reward is computed in each point in time. The calculation loops back-to-front, both in suffix size (shortest to longest) and in time (latest to oldest key scores). The reward may be the maximum per-key score for that character up until that point in time.

Given that a reward for suffix $S_{i-1}$ is already computed for each point in time, and that X is the currently processed character of the character string (that is, $S_i = X\ S_{i-1}$), the reward for $S_i$ is computed by the following formula:

$$\text{reward}(S_i, t_j) = \max(\text{KeyScore}(X, t_j) + \text{reward}(S_{i-1}, t_j), \text{reward}(S_i, t_{j+1}))$$

That is, in each moment t, the reward for the previously computed suffix is augmented by the currently processed key's score, and compared to the reward for the current suffix computed for the moment just after t. The larger of those two is kept as a final reward for the current suffix in that point in time.

Figure 6:
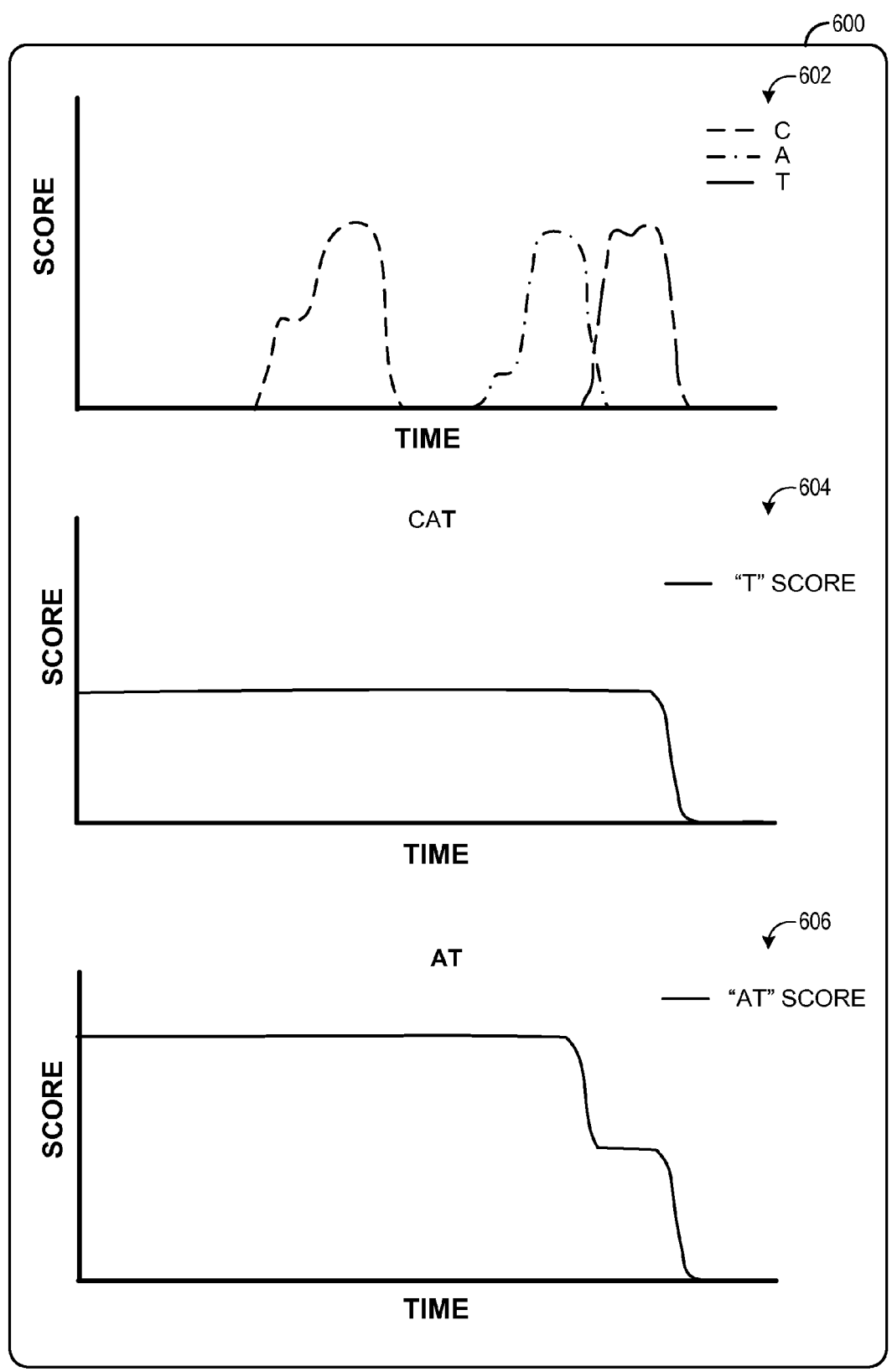
FIG. 6 is a diagram illustrating example character likelihood scores according to an embodiment of the present disclosure.

The reward calculation process 600 is shown FIG. 6, using the example eye-typing input as described in the previous figures. Per-key scores for "C", "A", and "T" are shown at 602. Reward computation for the first two suffixes of dictionary term "CAT" are shown at 604 (reward computation for T) and 606 (reward computation for AT). Reward for the first suffix "T" in 604 is computed such that for each point in time, the reward equals the maximum per-key score of key "T" from that point till end of the gaze sequence. The reward for "AT" (looking back in time, that is right to left) begins with a similar magnitude, but as soon as a key score for "A" starts rising, the reward becomes larger and larger, tracking the change. Even when the "A" score starts to decay, the reward for "AT" keeps track of its largest value from a corresponding point in time towards end of the sequence. The next reward may be computed for "CAT" in the same way.

While the reward calculation in the above-described embodiment is performed on suffixes starting from the last character and progressing to the first character, the order in which the character rewards are calculated is non-limiting, and other variations are considered. For example, the reward may be calculated on prefixes in a front-to-back manner with the first character being calculated first and progressing towards the last character.

The probability that a given character string is represented by the plurality of gaze samples may be computed based on various factors. If the eye-typing input is being entered as an Internet search, the prior probability of each string in the database may be considered. This probability depends on the actual frequency of the term in the entire Internet search corpora, but may be modeled as a function of term length and/or other term properties. The probability that a given string is represented by the gaze samples may also be based on the probability that the gaze data matches the term considering its shape and other properties.

Returning to FIG. 4, calculating the string likelihood score may also include penalizing strings based on stray distance and/or length of string at 414. Penalizing character strings based on the length of the string may include penalizing strings having a length longer than a threshold, such as seven characters, ten characters, or another suitable length. In this way, longer character strings may be penalized by a larger degree than shorter character strings. Penalizing based on stray distance may be determined by plotting a gaze shape, which connects gaze points adjacent in time, and comparing the shape with the "ideal" gaze path for a given character string. If the given character string does not match the plotted shape (within a threshold range), the string may be penalized.

Other mechanisms for penalizing scores are also possible. For example, character strings that include characters that match the order that the characters were gazed at, but that do not include intervening characters at which the user also gazed, may be penalized. For example, given gaze data indicating the keys B, R, E, A, and D were gazed at, the character string "BEAD" may be penalized, as it includes characters in a matching order, but excludes the character R.

At 416, the N highest scoring character strings are selected as the one or more likely terms. Selecting the N highest scoring character strings may be performed in a suitable manner. In one example, only the highest-scoring character string may be selected. In another example, the top two, three, or more highest-scoring character strings may be selected.

Figure 7:
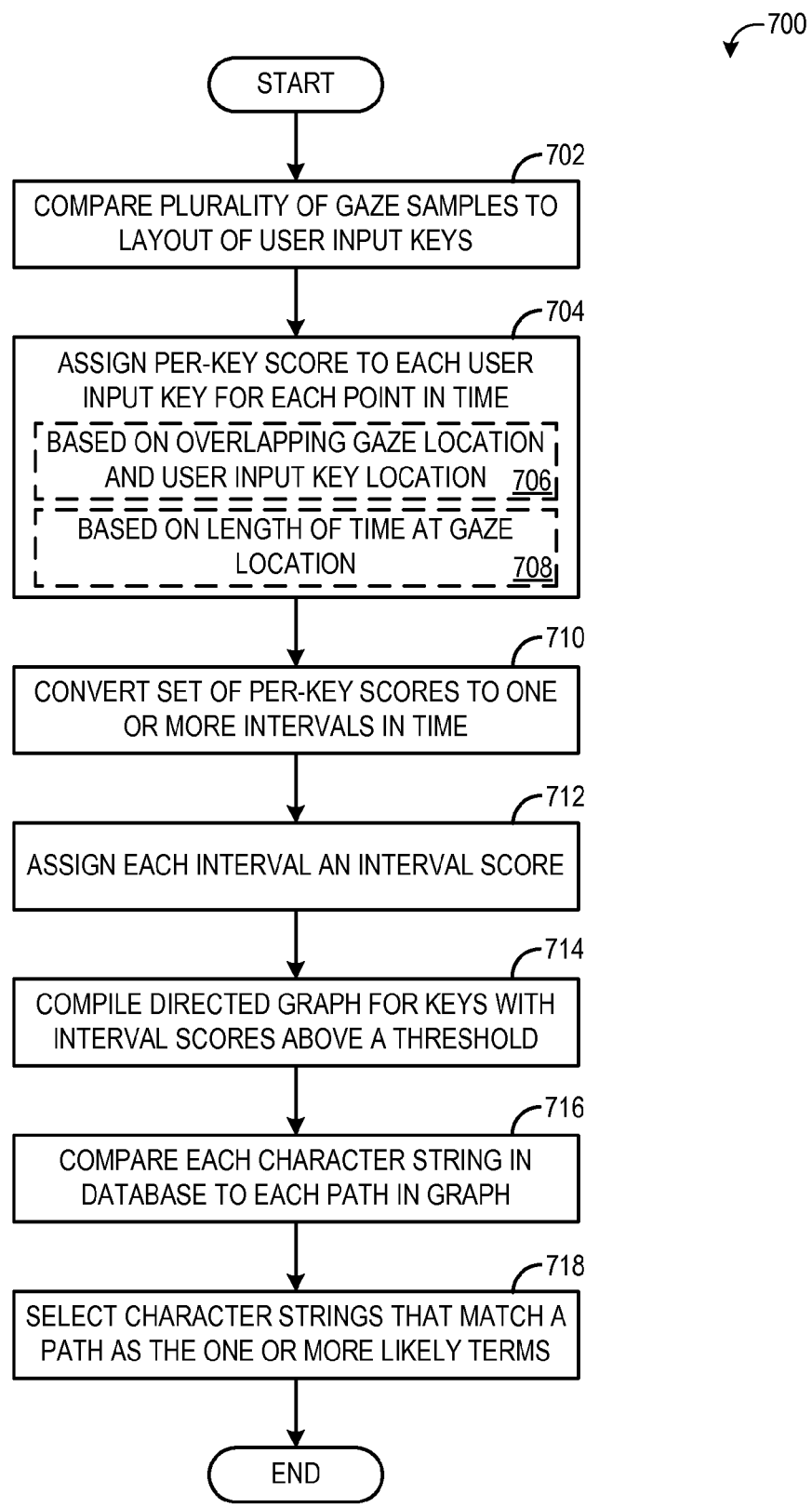
FIG. 7 is a flow chart illustrating another embodiment of a method for processing a plurality of gaze samples.

Turning now to FIG. 7, a method 700 for processing a plurality of gaze samples according to another embodiment of the present disclosure is depicted. Similar to the method 400 described above, method 700 may be carried out by a computing device during the execution of method 300 in order to determine one or more likely terms a user intended to eye-type.

Method 700 comprises, at 702, comparing the plurality of gaze samples to a layout of user input keys. At 704, a per-key score is assigned to each user input key for each point in time, based on overlapping gaze and key locations at 706 and length of gaze fixation at 708. The mechanism for correlating a user input key to a gaze location and calculating the per-key scores is the same as that described above with respect to FIGS. 4 and 5, and hence is not described in detail.

At 710, a set of per-key scores is converted to one or more intervals in time. The set of per-key scores may include each per-key score calculated for the duration of the eye-typing. One example mechanism for extracting the intervals comprises applying a fixed, empirically derived threshold to the per-key score set, and, for each key, creating a new interval between the time the score reached or went above the threshold, and the time the score dropped below the threshold again. Moreover, an interval may be split into two or more separate intervals if one or more key score "strong" local minima are found between the interval's boundaries. Thus, rather than assigning a per-key score to a particular key at each point in time, the key is given a time interval (or intervals) during which that key's score was above a threshold.

At 712, a score is assigned to each interval. The interval score describes the interval "strength" or the probability that the key corresponding to the interval was gazed at intentionally. One example mechanism for computing an interval's score may include determining the average per-key score of the corresponding key between the start and the end of the interval. Some intervals may overlap in time, meaning that in a particular point in time, it is not exactly known which key was intended to be gazed at. A possible set of discrete intervals is presented in FIG. 8, which depicts a graph 800 illustrating a subset of example intervals and corresponding scores derived from the per-key score set of FIG. 5. The interval scores for the input keys B, D, C, S, A, R, and T are illustrated, as these input keys had the highest per-key scores from FIG. 5. Other interval scores for other input keys have been omitted for clarity. The interval scores, which are depicted on the y-axis, may be normalized to a scale of 0 to 1. Time, in milliseconds, is depicted on the x-axis.

Returning to FIG. 7, at 714 a directed graph is compiled for the intervals having a score above a threshold. To compile the directed graph, the order in time in which keys were activated may be determined. Given two keys A and B, their corresponding intervals $I_A$ and $I_B$, and interval boundaries in time, [leftA, rightA] and [leftB, rightB], it is determined that key A was intended to be typed before key B if local maximum of A's score in time interval [leftA, rightA] occurs before local maximum of B's score in time interval [leftB, rightB].

For example, returning to FIG. 8, the "B" key on the provided example is active during a first time interval. The maximum of score for "B" during that interval has occurred at time $T_1$. On the other hand, the "C" key's first activation has happened during a second interval following the first, and its maximum score has occurred at $T_2$. The local maximum of the "B" key occurred before the local maximum of the "C" key, and therefore it is assumed that key "B" was activated before "C".

From the key activation order, a directed graph may be constructed. The graph nodes correspond to key intervals having a score above a threshold, and an edge between nodes, for example between B and C, exists if key C has been activated in some time interval after key B. The threshold may have any suitable value. Further, in some embodiments, the threshold may be set based on desired matching stringency.

For example, a relatively low threshold may allow for loosely-matching likely terms to be identified, which may introduce larger error yet compensate for a large amount of stray or other gaze issues.

Figure 8:
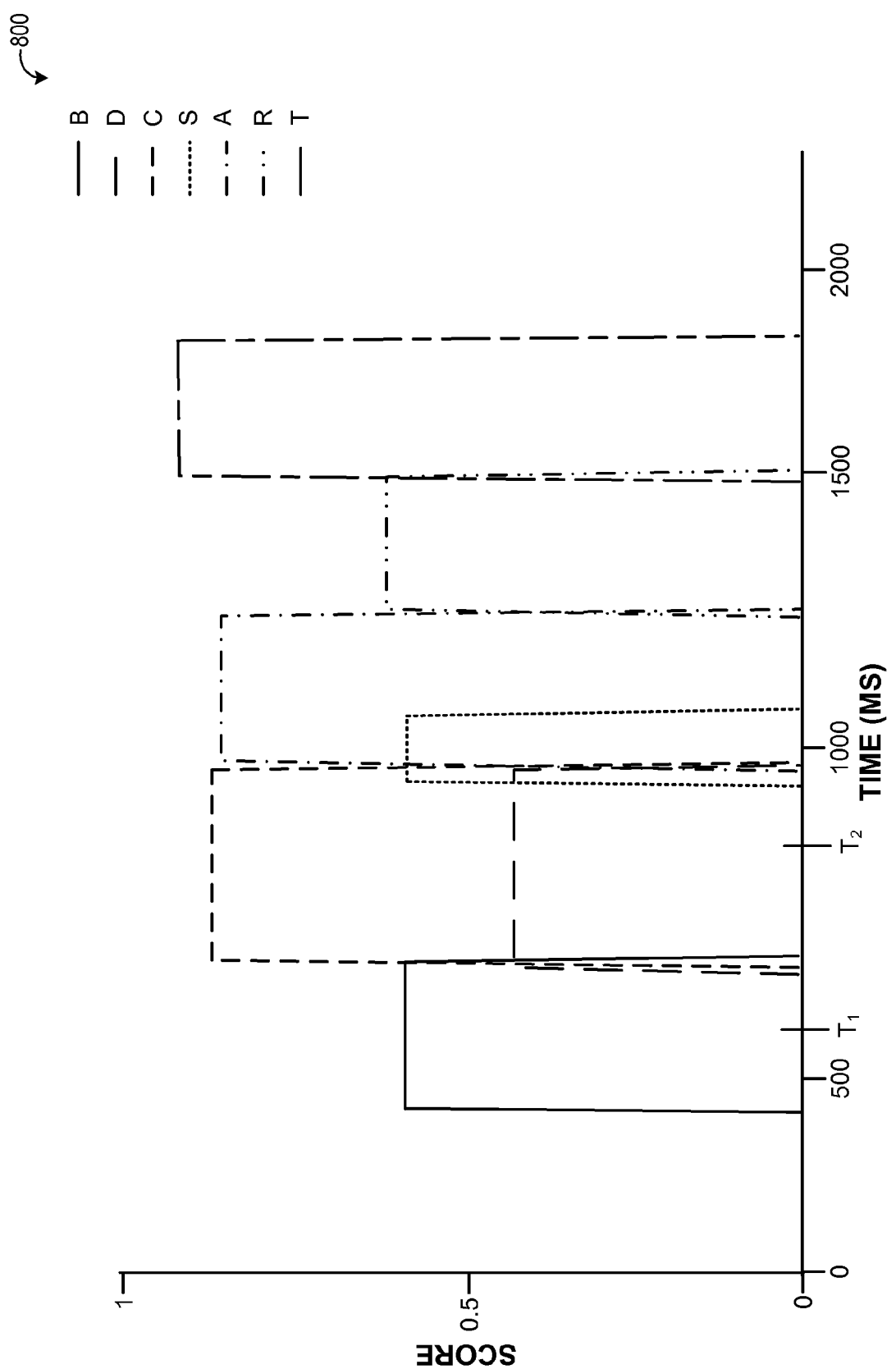
FIG. 8 is a diagram illustrating example interval scores for a plurality of gaze samples according to an embodiment of the present disclosure.
Figure 9:
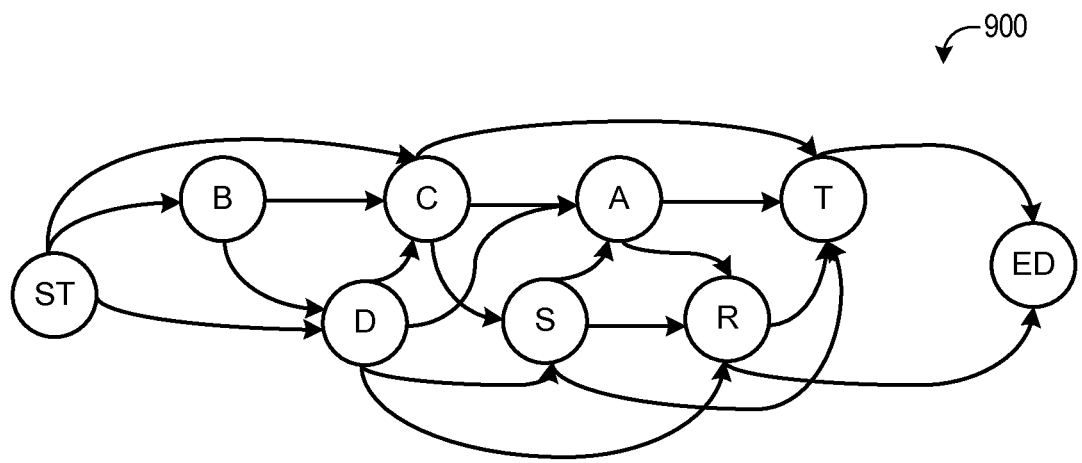
FIG. 9 is an example directed graph compiled from the interval scores of FIG. 8 according to an embodiment of the present disclosure.

FIG. 9 is an example directed graph 900 compiled from the interval scores depicted in FIG. 8. The directed graph starts at the node "ST", which has paths leading to the character nodes B, C, and D. Additional character nodes in the graph 900 include A, S, R, and T. Each character node in the graph is connected to at least two other nodes, and the graph ends at the node "ED".

Returning to FIG. 7, based on the per-key scores, interval scores, and directed graph illustrated in FIGS. 5 and 8-9, it can be seen that even if the intended input string was "CAT", in reality, other keys (besides "C", "A" and "T") were gazed at with a certain, non-negligible probability as well. Thus, multiple paths may be provided in the directed graph. To determine which path from the directed graph represents the intended term, a search for a matching character string may be performed by comparing a database of character strings, such as a dictionary, to each path of the directed graph at 716. For each character string, it is determined whether it is possible to construct the string by traversing the graph (e.g., going from graph's source towards its sink node). For the graph in FIG. 9 and the term "CAT", the path ST→C→A→T→ED does exist, and therefore the graph matches the character string. However, the input from the user may be misspelled, and hence the graph may almost match other character strings. Additionally, the graph may match or almost match more than character string.

In case of misspelling or calibration issues, an edit distance between the graph and a particular character string may be calculated. For example, in some such embodiments, a modified Levenshtein edit distance may be derived from a dynamic programming solution.

Determining the edit distance may include determining a "superstring" starting at a particular node. For example, a superstring starting at a first example node A comprises a set of all possible different strings that can be constructed starting at node A, and ending in the graph's sink node. For the example directed graph of FIG. 9, a superstring starting at "C" is a set of strings including "C", "CA", "CS", "CAT", "CSA", etc. The edit distance between a graph node N and a database character string S may be defined as a minimum of edit distances between S and all the strings from a superstring starting at N. For the example given, an edit distance between the node "C" and a string "CAT" is 0, while edit distance between the same node and a string "PAT" will be 1.

For each graph node N, and each suffix of the current character string S of length n ($S_1, S_2, \ldots, S_n$), a minimum edit distance between $S_n$ and node N is computed. Since the graph is directed, and may be topologically sorted in time, the computation may be performed using dynamic programming, going backwards in time node by node, similar to the process described with respect to FIG. 4.

Once the described edit distances are computed for all the child nodes of node N, computing the edit distance for the node N may be performed in some embodiments using the following example formula:

$$BestDist.(\text{children of } N, S_i) =$$
$$\min_{j=1 \ldots \text{number of node } N \text{ children}} EditDist.(child_j, S_i)$$

$$EditDistance(N, S_i) = BestDist.(\text{children of } N, S_{i-1}), \text{ if key } (N) = S[i]$$

$$EditDistance(N, S_i) = \min \left\{ \begin{array}{l} BestDist.(\text{children of } N, S_{i-1}) \\ BestDist.(\text{children of } N, S_i) \\ EditDist.(N, S_{i-1}) \end{array} \right\} + 1,$$

if key $(N) \neq S[i]$

The key(N) denotes the character symbol corresponding to the node N, and S[i] is i-th character symbol of the character string S. The three terms inside the smaller bracket correspond to standard edit distance operations (substitution, deletion, and insertion, respectively). In other embodiments, any other suitable formula may be used.

If the graph matches (or almost matches) more than one search term from the database, factors including edit distance, sum of key scores, number of strays and others may influence the final score for differentiating between all character strings that match the constructed graph. Deciding which factor influences the score to which extent may be done empirically using a parameter optimization technique against a labeled training set.

At 718, one or more character strings that match a path in the graph may be selected as the one or more likely terms. As explained above, in some embodiments, this may include selecting strings that have a minimum edit distance from a path in the graph (in addition to selecting strings that match a path in the graph), to allow for misspelled terms and/or calibration errors. In other embodiments, the strings may be selected in any other suitable manner.

Thus, the methods of FIGS. 3-4 and 7 provide for collecting gaze samples corresponding to user eye-typing input on an on-screen keyboard. The gaze samples may be processed to assign a per-key score to each key of the keyboard for each collected point in time. Based on these per-key scores, one or more likely terms that the user intended to type may be determined. The one or more likely terms may be returned to the user via a display. In some examples, the user may select a likely term to enter as a term into a search function.

Figure 10:
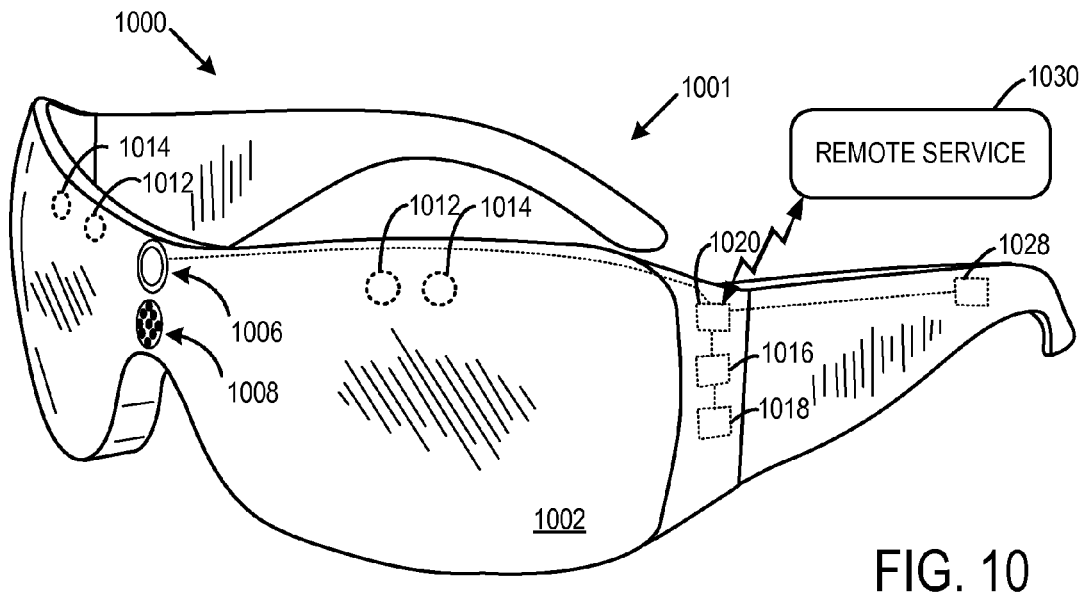
FIG. 10 shows an example HMD device including a see-through display system according to an embodiment of the present disclosure.
Figure 11:
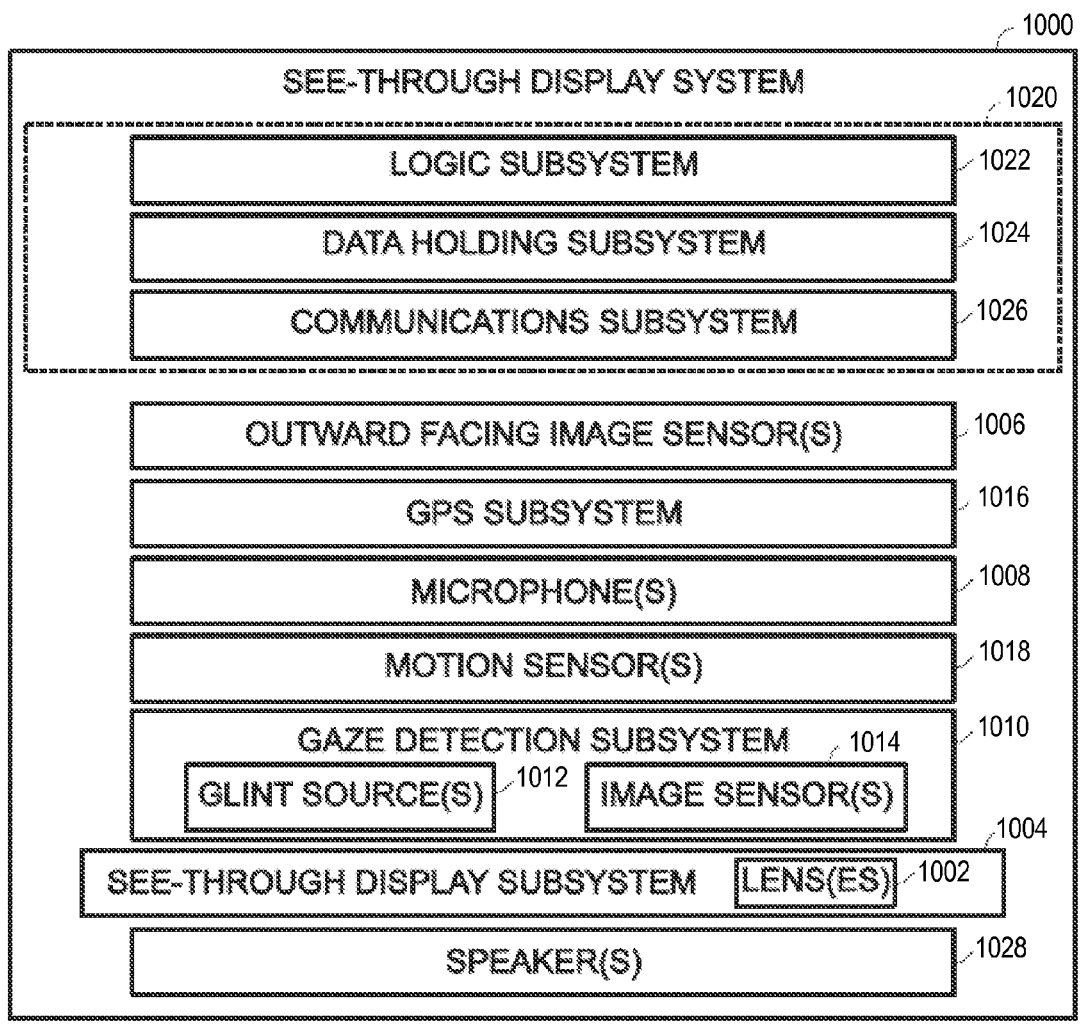
FIG. 11 shows a block diagram of the embodiment of FIG. 10.

The above-described methods may be carried out on a computing device configured to receive gaze information for one or more gaze detecting sensors. Example devices include, but are not limited to, head-mounted see-through display (HMD) devices. FIG. 10 shows an example embodiment of an HMD device 1000 including a see-through display system 1001, and FIG. 11 shows a block diagram of the see-through display system 1001.

The see-through display system 1001 comprises one or more lenses 1002 that form a part of a see-through display subsystem 1004, such that images may be projected onto the lenses 1002, or produced by image-producing elements (e.g. see-through OLED displays) located within the lenses 1002. For example, the on-screen keyboard 100 of FIG. 1 may be projected or otherwise displayed on the lenses 1002. The see-through display system 1001 further comprises one or more outward facing image sensors 1006 configured to acquire images of a background scene being viewed by a user, and may include one or more microphones 1008 configured to detect sounds, such as voice commands from a user. The outward facing image sensors 1006 may include one or more depth sensors and/or one or more two-dimensional image sensors.

The see-through display system 1001 further comprises a gaze detection subsystem 1010 configured to detect a direction of gaze of each eye of a user, as described above. The gaze detection subsystem 1010 may be configured to determine gaze directions of each of a user's eyes in any suitable manner. For example, in the depicted embodiment, the gaze detection subsystem 1010 comprises one or more glint sources 1012, such as infrared light sources, configured to cause a glint of light to reflect from each eyeball of a user, and one or more image sensors 1014 configured to capture an image of each eyeball of the user. Changes in the glints from the user's eyeballs as determined from image data gathered via image sensor(s) 1014 may be used to determine a direction of gaze. Further, a location at which gaze lines projected from the user's eyes intersect the external display may be used to determine an object at which the user is gazing (e.g. a virtual object displayed on an external display). The gaze detection subsystem 1010 may have any suitable number and arrangement of light sources and image sensors. In one non-limiting example embodiment, four glint sources and one image sensor are used for each eye.

The see-through display system 1001 may further comprise additional sensors. For example, see-through display system 1001 may comprise a global positioning (GPS) subsystem 1016 to allow a location of the see-through display system 1001 to be determined. Information regarding the user's location may then be used, for example, to help determine the identity of an object on an external display at which the user is gazing.

The see-through display system 1001 further may include one or more motion sensors 1018 to detect movements of a user's head when the user is wearing the see-through display system 1001. Motion data may be used, potentially along with eye-tracking glint data and outward-facing image data, for gaze detection, as well as for image stabilization to help correct for blur in images from the outward-facing image sensor(s) 1006. The use of motion data may allow changes in gaze location to be tracked even if image data from the outward-facing image sensor(s) 1006 cannot be resolved. Likewise, the motion sensors 1018, as well as the microphone(s) 1008 and the gaze detection subsystem 1010, also may be employed as user input devices, such that a user may interact with see-through display system 1001 via gestures of the eye, neck and/or head, as well as via verbal commands. It will be understood that sensors illustrated in FIGS. 10 and 11 are shown for the purpose of example and are not intended to be limiting in any manner, as any other suitable sensors and/or combination of sensors may be utilized.

The see-through display system 1001 further comprises a controller 1020 having a logic subsystem 1022 and a data holding subsystem 1024 in communication with the sensors, the gaze detection subsystem 1010, and the see-through display subsystem 1004. The data holding subsystem 1024 comprises instructions stored thereon that are executable by logic subsystem 1022, for example, to receive and interpret inputs from the sensors, to determine a location of an on-screen keyboard at which the user is gazing, to send information (e.g. gaze samples) to an external computing device for identification of the one or more likely terms represented by the gaze samples via a communications subsystem 1026, and to receive and potentially present contextual information regarding the object via the see-through display subsystem 1004, and/or via one or more speakers 1028. It will be understood that data holding subsystem 1024 also may store information regarding other objects displayed on the external display screen (e.g. a list of user interface controls locations and identities/functions). As one non-limiting example, a remote service 1030 is illustrated in communication with the controller communications subsystem 1026. The remote service 1030 may be configured to receive information from the HMD device, such as a data set including a plurality of gaze samples, in order to determine one or more likely terms from the gaze samples, as described above with respect to FIG. 3. Further information regarding example hardware for the logic subsystem 1022, data holding subsystem 1024, and other above-mentioned components is described below with reference to FIG. 12.

It will be appreciated that the HMD device 1000 is provided by way of example, and thus is not meant to be limiting. Therefore it is to be understood that the HMD device may include additional and/or alternative sensors, cameras, microphones, input devices, output devices, etc. than those shown without departing from the scope of this disclosure. The physical configuration of an HMD device and its various sensors and subcomponents may take a variety of different forms without departing from the scope of this disclosure. Further, rather than displaying the on-screen keyboard and collecting the gaze samples via an HMD device, other devices may be used. Mobile computing devices, laptop computers, desktop computers, other wearable computing devices, televisions, set-top boxes, and any other computing devices are also within the scope of this disclosure.

Figure 12:
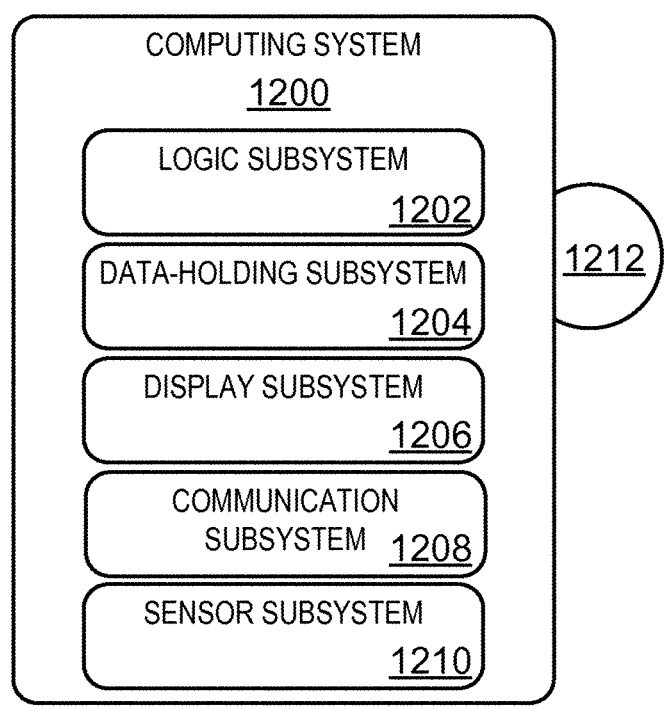
FIG. 12 schematically shows an embodiment of a computing system.

In some embodiments, the above described methods and processes may be implemented as a computer application, computer service, computer API, computer library, and/or other computer program product. FIG. 12 schematically shows a non-limiting computing system 1200 that may perform one or more of the above described methods and processes. Computing system 1200 may represent HMD device 1000, a computing system separate from HMD device 1000 but communicatively coupled to the HMD device, such as the remote service discussed above with respect to FIG. 3, a computing system configured to display an on-screen keyboard and/or collect a plurality of gaze samples, and/or any other suitable computing system. Computing system 1200 is shown in simplified form. It is to be understood that virtually any computer architecture may be used without departing from the scope of this disclosure. In different embodiments, computing system 1200 may take the form of a mainframe computer, server computer, desktop computer, laptop computer, tablet computer, home entertainment computer, network computing device, mobile computing device, mobile communication device, gaming device, etc.

Computing system 1200 includes a logic subsystem 1202 and a data-holding subsystem 1204. Computing system 1200 may optionally include a display subsystem 1206, communication subsystem 1208, sensor subsystem 1210, and/or other components not shown in FIG. 12. Computing system 1200 may also optionally include user input devices such as keyboards, mice, game controllers, cameras, microphones, and/or touch screens, for example.

Logic subsystem 1202 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 1204 may include one or more physical, non-transitory, devices configured to hold data and/or instructions executable by the logic subsystem to implement the herein described methods and processes. When such methods and processes are implemented, the state of data-holding subsystem 1204 may be transformed (e.g., to hold different data).

Data-holding subsystem 1204 may include removable media and/or built-in devices. Data-holding subsystem 1204 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 1204 may include devices with one or more of the following characteristics: volatile, nonvolatile, dynamic, static, read/write, read-only, random access, sequential access, location addressable, file addressable, and content addressable. In some embodiments, logic subsystem 1202 and data-holding subsystem 1204 may be integrated into one or more common devices, such as an application specific integrated circuit or a system on a chip.

FIG. 12 also shows an aspect of the data-holding subsystem in the form of removable computer-readable storage media 1212, which may be used to store and/or transfer data and/or instructions executable to implement the herein described methods and processes. Removable computer-readable storage media 1212 may take the form of CDs, DVDs, HD-DVDs, Blu-Ray Discs, EEPROMs, and/or floppy disks, among others.

It is to be appreciated that data-holding subsystem 1204 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The term "program" may be used to describe an aspect of computing system 1200 that is implemented to perform one or more particular functions. In some cases, such a program may be instantiated via logic subsystem 1202 executing instructions held by data-holding subsystem 1204. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It is to be appreciated that a "service", as used herein, may be an application program executable across multiple user sessions and available to one or more system components, programs, and/or other services. In some implementations, a service may run on a server responsive to a request from a client.

When included, display subsystem 1206 may be used to present a visual representation of data held by data-holding subsystem 1204. As the herein described methods and processes change the data held by the data-holding subsystem, and thus transform the state of the data-holding subsystem, the state of display subsystem 1206 may likewise be transformed to visually represent changes in the underlying data. Display subsystem 1206 may include one or more display devices utilizing virtually any type of technology. Such display devices may be combined with logic subsystem 1202 and/or data-holding subsystem 1204 in a shared enclosure, or such display devices may be peripheral display devices.

When included, communication subsystem 1208 may be configured to communicatively couple computing system 1200 with one or more other computing devices. Communication subsystem 1208 may include wired and/or wireless communication devices compatible with one or more different communication protocols. As non-limiting examples, the communication subsystem may be configured for communication via a wireless telephone network, a wireless local area network, a wired local area network, a wireless wide area network, a wired wide area network, an inter-process communication within the computing system 1200, etc. In some embodiments, the communication subsystem may allow computing system 1200 to send and/or receive messages to and/or from other devices via a network such as the Internet.

When included, sensor subsystem 1210 may include one or more sensors configured to sense different physical phenomenon (e.g., visible light, infrared light, acceleration, orientation, position, etc.), as described above. For example, the sensor subsystem 1210 may comprise one or more image sensors, motion sensors such as accelerometers, touch pads, touch screens, and/or any other suitable sensors. Therefore, sensor subsystem 1210 may be configured to provide observation information to logic subsystem 1202, for example. As described above, observation information such as image data, motion sensor data, and/or any other suitable sensor data may be used to perform such tasks as determining a particular gesture performed by the one or more human subjects.

In some embodiments, sensor subsystem 1210 may include a depth camera. The depth camera may include left and right cameras of a stereoscopic vision system, for example. Time-resolved images from both cameras may be registered to each other and combined to yield depth-resolved video.

In other embodiments, the depth camera may be a structured light depth camera configured to project a structured infrared illumination comprising numerous, discrete features (e.g., lines or dots). The depth camera may be configured to image the structured illumination reflected from a scene onto which the structured illumination is projected. Based on the spacings between adjacent features in the various regions of the imaged scene, a depth image of the scene may be constructed.

In other embodiments, the depth camera may be a time-of-flight camera configured to project a pulsed infrared illumination onto the scene. The depth camera may include two cameras configured to detect the pulsed illumination reflected from the scene. Both cameras may include an electronic shutter synchronized to the pulsed illumination, but the integration times for the cameras may differ, such that a pixel-resolved time-of-flight of the pulsed illumination, from the source to the scene and then to the cameras, is discernible from the relative amounts of light received in corresponding pixels of the two cameras.

In some embodiments, sensor subsystem 1210 may include a visible light camera. Virtually any type of digital camera technology may be used without departing from the scope of this disclosure. As a non-limiting example, the visible light camera may include a charge coupled device image sensor.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
a logic subsystem, and
a data-holding subsystem comprising instructions executable by the logic subsystem to
receive a data set comprising a plurality of gaze samples, each gaze sample comprising a gaze location and a corresponding point in time;
process the plurality of gaze samples to determine one or more likely terms represented by the data set by comparing the plurality of gaze samples to a layout of user input keys displayed on a display, and
based on overlapping user input key and gaze locations and a length of time spent gazing at each user input key, assign a per-key score to a plurality of user input keys for each gaze sample; and
provide the one or more likely terms to a display device for display.

2. The computing device of claim 1, wherein the data set is received from a remote device via a network.

3. The computing device of claim 1, wherein the instructions are executable to receive the data set by
receiving a trigger input indicating an initiation of eye-typing input;
receiving the plurality of gaze samples from one or more image sensors; and
receiving an input signaling an end of the eye-typing input, wherein the corresponding point in time is a time from the trigger.

4. The computing device of claim 1, wherein the instructions are further executable to, based on the per-key scores, compile a string likelihood score for each character string in a character string database.

5. The computing device of claim 4, wherein the instructions are executable to compile the string likelihood score such that the string likelihood score rewards character strings including two or more characters in a similar order to an order in which corresponding user input keys received a user gaze.

6. The computing device of claim 1, wherein the instructions are further executable to present to the user one or more character strings having a high string likelihood score as the one or more likely terms.

7. The computing device of claim 1, wherein the instructions are further executable to convert a set of per-key scores to one or more intervals in time, and assign an interval score to each interval.

8. The computing device of claim 7, wherein the instructions are further executable to
compile a directed graph of one or more characters, each character corresponding to a user input key having an interval score above a threshold over a period of time; and
compare each character string from a character string database to the directed graph, and send to the display one or more character strings that match a path from the directed graph to be displayed as the one or more likely terms.

9. The computing device of claim 1, wherein the instructions are further executable to
display the one or more likely terms via a display;
receive a gaze sample indicative of a selection of one of the one or more likely terms; and
request from a service information relating to the selected term.

10. A computing device, comprising:
a display;
a logic subsystem comprising a processor configured to execute instructions; and
a storage subsystem comprising instructions executable by the logic subsystem to receive a trigger input indicating initiation of eye-typing;
receive a plurality of gaze samples each comprising a gaze location and a corresponding time from the trigger;
receive an input signaling an end of the eye-typing input;
compare the plurality of gaze samples to a layout of user input keys displayed on the display, and based on overlapping user input key and gaze locations, assigning a per-key score to each user input key for each point in time;
based on the per-key scores, compile a string likelihood score for each character string in a character string database; and
display on the display one or more likely terms corresponding to character strings having a high string likelihood score.

11. The computing device of claim 10, wherein instructions are executable to receive the trigger input by receiving an input of a gaze location at a trigger region displayed on the display.

12. The computing device of claim 10, wherein the string likelihood score is configured to reward character strings including two or more characters in a similar order to an order at which corresponding user input keys were gazed.

13. The computing device of claim 10, wherein the string likelihood score is configured to penalize character strings having a length greater than a threshold.

14. The computing device of claim 10, wherein the display comprises a see-through display.

15. A computing device, comprising:
a display;
a logic subsystem comprising a processor configured to execute instructions; and
a storage subsystem comprising instructions executable by the logic subsystem to receive a trigger input indicating initiation of eye-typing;
receive a plurality of gaze samples each comprising a gaze location and a corresponding time from the trigger;
receive an input signaling an end of the eye-typing input;
compare the plurality of gaze samples to a layout of user input keys displayed on the display, and based on overlapping user input key and gaze locations, assign a per-key score to each user input key for each point in time;
convert a set of per-key scores to one or more intervals in time, and assigning an interval score to each interval;
compile a directed graph of one or more characters, each character corresponding to a user input key having an interval score above a threshold; and
compare each character string from a character string database to the directed graph, and display on the display one or more likely terms corresponding to character strings that match a path from the directed graph.

16. The computing device of claim 15, wherein the instructions are executable to assign each per-key score based on a length of time each respective key was gazed at.

17. The computing device of claim 15, wherein the instructions are executable to convert the set of per-key scores to one or more intervals in time by assigning an interval in time to a particular key, the interval including a time duration from when a per-key score for that particular key reached a threshold to when that key's per-key score dropped below the threshold.

18. The computing device of claim 15, wherein the interval score comprises an average per-key score for that particular key during the interval.

19. The computing device of claim 15, wherein the instructions are executable to display on the display one or more likely terms corresponding to character strings that match a path from the directed graph further by displaying on the display one or more likely terms corresponding to character strings that are less than a threshold edit distance from a path of the directed graph.

* * * * *